United States Patent
Dalsgaard et al.

(10) Patent No.: US 12,375,960 B2
(45) Date of Patent: Jul. 29, 2025

(54) BEAM TRACKING FOR REDUCED LATENCY

(71) Applicant: Nokia Technologies Oy, Espoo (FI)

(72) Inventors: Lars Dalsgaard, Oulu (FI); Mikko Säily, Laukkoski (FI); Tero Henttonen, Espoo (FI); Elena Virtej, Espoo (FI)

(73) Assignee: Nokia Technologies Oy, Espoo (FI)

( * ) Notice: Subject to any disclaimer, the term of this patent is extended or adjusted under 35 U.S.C. 154(b) by 67 days.

(21) Appl. No.: 17/636,069

(22) PCT Filed: Aug. 19, 2019

(86) PCT No.: PCT/US2019/047077
§ 371 (c)(1),
(2) Date: Feb. 17, 2022

(87) PCT Pub. No.: WO2021/034313
PCT Pub. Date: Feb. 25, 2021

(65) Prior Publication Data
US 2022/0286888 A1     Sep. 8, 2022

(51) Int. Cl.
*H04W 24/10* (2009.01)
*H04W 16/28* (2009.01)
(Continued)

(52) U.S. Cl.
CPC .......... *H04W 24/10* (2013.01); *H04W 16/28* (2013.01); *H04W 56/001* (2013.01); *H04W 76/20* (2018.02)

(58) Field of Classification Search
CPC ... H04W 24/10; H04W 16/28; H04W 56/001; H04W 76/20; H04W 24/02; H04W 48/16;
(Continued)

(56) References Cited

U.S. PATENT DOCUMENTS

| 2015/0271713 A1 | 9/2015 | Kim et al. |
| 2016/0205580 A1 | 7/2016 | Pragada et al. |

(Continued)

FOREIGN PATENT DOCUMENTS

| CN | 108353443 A | 7/2018 |
| CN | 108476101 A | 8/2018 |

(Continued)

OTHER PUBLICATIONS

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

(Continued)

*Primary Examiner* — Mazda Sabouri
(74) *Attorney, Agent, or Firm* — Nokia Technologies Oy

(57) ABSTRACT

Systems, methods, apparatuses, and computer program products for beam tracking to reduce latency. A method may include receiving from a network node, a radio resource control reconfiguration message. The method may also include sending a radio resource control reconfiguration complete message in response to the radio resource control reconfiguration message. The method may further include performing radio resource management measurements according to information contained in the radio resource control reconfiguration message. In addition, the method may include preparing a measurement report based on the radio resource management measurements. Further, the method may include sending the measurement report to the network node. The method may also include maintaining a spatial relation with a cell or a carrier that is identified in the measurement report, as indicated in the radio resource control reconfiguration message.

10 Claims, 16 Drawing Sheets

(51) Int. Cl.
*H04W 56/00* (2009.01)
*H04W 76/20* (2018.01)

(58) Field of Classification Search
CPC ... H04B 7/0619; H04B 17/309; H04L 5/0053; H04L 5/0092
USPC .......................................... 370/329, 205, 328
See application file for complete search history.

(56) References Cited

U.S. PATENT DOCUMENTS

| | | | |
|---|---|---|---|
| 2018/0279184 A1 | 9/2018 | Burbidge et al. | |
| 2019/0021052 A1 | 1/2019 | Kadiri et al. | |
| 2019/0140752 A1* | 5/2019 | Annam | H04W 24/10 |
| 2019/0150161 A1 | 5/2019 | Cheng et al. | |
| 2020/0314946 A1* | 10/2020 | Tsuboi | H04W 24/10 |

FOREIGN PATENT DOCUMENTS

| | | |
|---|---|---|
| CN | 111972026 A | 11/2020 |
| WO | 2013/052805 A1 | 4/2013 |
| WO | 2017/022902 A1 | 2/2017 |
| WO | 2018/085049 A1 | 5/2018 |
| WO | 2019/064258 A1 | 4/2019 |

OTHER PUBLICATIONS

"3rd Generation Partnership Project; Technical Specification Group Radio Access Network; Evolved Universal Terrestrial Radio Access (E-UTRA); Requirements for support of radio resource management (Release 16)", 3GPP TS 36.133, V16.1.0, Mar. 2019, pp. 1-3118.

"3rd Generation Partnership Project; Technical Specification Group Radio Access Network; NR; Requirements for support of radio resource management (Release 15)", 3GPP TS 38.133, V15.5.0, Mar. 2019, pp. 1-893.

International Search Report and Written Opinion received for corresponding Patent Cooperation Treaty Application No. PCT/US2019/047077, dated Nov. 15, 2019, 9 pages.

Extended European Search Report received for corresponding European Patent Application No. 19941944.1, dated Mar. 21, 2023, 11 pages.

"Feature lead summary 2 for beam measurement and reporting", 3GPP TSG-RAN WG1 Meeting #93, R1-1807679, Agenda: 7.1.2.2.3, Ericsson, May 21-25, 2018, pp. 1-35.

Office action received for corresponding Indian Patent Application No. 202247013701, dated Aug. 11, 2022, 5 pages.

Office action received for corresponding Chinese Patent Application No. 201980101438.X, dated Jun. 21, 2024, 8 pages of office action and no page of translation available.

* cited by examiner

```
EventTriggerConfig::=            SEQUENCE {
-- NOTE: UNNECESSARY PARTS OF EXISTING ASN.1 SIGNALLING OMITTED --
    reportQuantityRS-Indexes          MeasReportQuantity                      OPTIONAL,    -- Need R
    maxNrofRS-IndexesToReport         INTEGER (1..maxNrofIndexesToReport)     OPTIONAL,    -- Need R
    includeBeamMeasurements           BOOLEAN,
```

FIG. 1

```
MeasConfig ::=                      SEQUENCE {
    measObjectToRemoveList              MeasObjectToRemoveList      OPTIONAL,   -- Need N
    measObjectToAddModList              MeasObjectToAddModList      OPTIONAL,   -- Need N
    reportConfigToRemoveList            ReportConfigToRemoveList    OPTIONAL,   -- Need N
    reportConfigToAddModList            ReportConfigToAddModList    OPTIONAL,   -- Need N
    measIdToRemoveList                  MeasIdToRemoveList          OPTIONAL,   -- Need N
    measIdToAddModList                  MeasIdToAddModList          OPTIONAL,   -- Need N
    s-MeasureConfig                     CHOICE {
        ssb-RSRP                            RSRP-Range,
        csi-RSRP                            RSRP-Range
    }                                                               OPTIONAL,   -- Need M
    quantityConfig                      QuantityConfig              OPTIONAL,   -- Need M
    measGapConfig                       MeasGapConfig               OPTIONAL,   -- Need M
    measGapSharingConfig                MeasGapSharingConfig        OPTIONAL,   -- Need M
    ...,
    [[
    trackCellsForBeamReporting          BOOLEAN                     OPTIONAL    -- Need M
    ]]
}
```

FIG. 2(a)

```
EventTriggerConfig::=            SEQUENCE {
-- NOTE: UNNECESSARY PARTS OF EXISTING ASN.1 SIGNALLING OMITTED --
    reportQuantityRS-Indexes      MeasReportQuantity                    OPTIONAL,   -- Need R
    maxNrofRS-IndexesToReport     INTEGER (1..maxNrofIndexesToReport)   OPTIONAL,   -- Need R
    includeBeamMeasurements       BOOLEAN,
    reportAddNeighMeas            ENUMERATED {setup}                    OPTIONAL,   -- Need R
    ...,
    [[
    trackCellsForBeamReporting    BOOLEAN                               OPTIONAL    -- Need M
    ]]
}
```

FIG. 2(b)

```
MeasObjectNR ::=            SEQUENCE {
    ssbFrequency            ARFCN-ValueNR       OPTIONAL,    -- Cond SSBorAssociatedSSB
-- NOTE: UNNECESSARY PARTS OF EXISTING ASN.1 SIGNALLING OMITTED --
    ...,
    [[
    trackCellsForBeamReporting  BOOLEAN         OPTIONAL     -- Need M
    ]]
}
```

FIG. 2(c)

```
MeasConfig ::=                    SEQUENCE {
    measObjectToRemoveList            MeasObjectToRemoveList         OPTIONAL,    -- Need N
    measObjectToAddModList            MeasObjectToAddModList         OPTIONAL,    -- Need N
    reportConfigToRemoveList          ReportConfigToRemoveList       OPTIONAL,    -- Need N
    reportConfigToAddModList          ReportConfigToAddModList       OPTIONAL,    -- Need N
    measIdToRemoveList                MeasIdToRemoveList             OPTIONAL,    -- Need N
    measIdToAddModList                MeasIdToAddModList             OPTIONAL,    -- Need N
    s-MeasureConfig                   CHOICE {
        ssb-RSRP                          RSRP-Range,
        csi-RSRP                          RSRP-Range
    }                                                                OPTIONAL,    -- Need M
    quantityConfig                    QuantityConfig                 OPTIONAL,    -- Need M
    measGapConfig                     MeasGapConfig                  OPTIONAL,    -- Need M
    measGapSharingConfig              MeasGapSharingConfig           OPTIONAL,    -- Need M
    ...,
    [[
    trackedCellsForBeamReporting      TrackedCellsForBeamReporting   OPTIONAL     -- Need M
    ]]
}

TrackedCellsForBeamReporting ::= SEQUENCE {
    trackMeasObjectToRemoveList       MeasObjectToRemoveList         OPTIONAL,    -- Need N
    trackMeasObjectToAddModList       MeasObjectToAddModList         OPTIONAL,    -- Need N
    trackReportConfigToRemoveList     ReportConfigToRemoveList       OPTIONAL,    -- Need N
    trackReportConfigToAddModList     ReportConfigToAddModList       OPTIONAL,    -- Need N
    trackMeasIdToRemoveList           MeasIdToRemoveList             OPTIONAL,    -- Need N
    trackMeasIdToAddModList           MeasIdToAddModList             OPTIONAL,    -- Need N
    ...
}
```

FIG. 3(a)

```
EventTriggerConfig::=                   SEQUENCE {
-- NOTE: UNNECESSARY PARTS OF EXISTING ASN.1 SIGNALLING OMITTED --
    reportQuantityRS-Indexes        MeasReportQuantity                                      OPTIONAL,    -- Need R
    maxNrofRS-IndexesToReport       INTEGER (1..maxNrofIndexesToReport)                     OPTIONAL,    -- Need R
    includeBeamMeasurements         BOOLEAN,
    reportAddNeighMeas              ENUMERATED {setup}                                      OPTIONAL,    -- Need R
    ...,
    [[
    carrierForBeamReportingList     SetupRelease {CarrierForBeamReportingList}   OPTIONAL   -- Need M
    ]]
}

CarrierForBeamReportingList ::= SEQUENCE (SIZE (1..maxTrackedCarriers)) OF CarrierForBeamReporting CarrierForBeamReporting ::= SEQUENCE {
    ssbFrequency        ARFCN-ValueNR                                              OPTIONAL,    -- Need R
    cellsToTrack        PCI-List                                                   OPTIONAL,    -- Need R
    ...
}
```

FIG. 3(b)

```
MeasObjectNR ::=          SEQUENCE {
    ssbFrequency          ARFCN-ValueNR              OPTIONAL,   -- Cond SSBorAssociatedSSB
-- NOTE: UNNECESSARY PARTS OF EXISTING ASN.1 SIGNALLING OMITTED --
    ...,
    [[
    trackCellsForBeamReporting BOOLEAN               OPTIONAL    -- Need M
    ]]
}
```

FIG. 3(c)

```
RRCReconfigurationComplete-v1530-IEs ::=    SEQUENCE {
    uplinkTxDirectCurrentList               UplinkTxDirectCurrentList               OPTIONAL,
    nonCriticalExtension                    RRCReconfigurationComplete-vxxyy-IEs    OPTIONAL
}

RRCReconfigurationComplete-vxxyy-IEs ::=    SEQUENCE {
    capabilityReductionForBeamTracking      CapabilityReductionForBeamTracking      OPTIONAL,
    nonCriticalExtension                    SEQUENCE {}                             OPTIONAL
}

CapabilityReductionForBeamTracking ::= SEQUENCE {
    featureSetChangeRequest    FeatureSetCombinationId                               OPTIONAL,   -- Need R
    maximumDataRate            ENUMERATED {m50, m100, m200, m300,
                                           m400, m500, m600, m1000}                 OPTIONAL,   -- Need R
    measGapNeeded              BOOLEAN                                               OPTIONAL,   -- Need R
    ...
}
```

FIG. 7

BEAM TRACKING FOR REDUCED LATENCY

RELATED APPLICATION

This application claims priority to PCT Patent Application No. PCT/US2019/047077, filed Aug. 19, 2019 which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for beam tracking to reduce latency.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

One embodiment may be directed to a method. The method may include receiving from a network node, a radio resource control reconfiguration message. The method may also include sending a radio resource control reconfiguration complete message in response to the radio resource control reconfiguration message. The method may further include performing radio resource management measurements according to information contained in the radio resource control reconfiguration message. The method may also include preparing a measurement report based on the radio resource management measurements. In addition, the method may include sending the measurement report to the network node. Further, the method may include maintaining a spatial relation with a cell or a carrier that is identified in the measurement report, as indicated in the radio resource control reconfiguration message.

Another example embodiment may be directed to an apparatus. The apparatus may include means for receiving from a network node, a radio resource control reconfiguration message. The apparatus may also include means for sending a radio resource control reconfiguration complete message in response to the radio resource control reconfiguration message. The apparatus may further include means for performing radio resource management measurements according to information contained in the radio resource control reconfiguration message. The apparatus may also include means for preparing a measurement report based on the radio resource management measurements. In addition, the apparatus may include means for sending the measurement report to the network node. Further, the apparatus may include means for maintaining a spatial relation with a cell or a carrier that is identified in the measurement report, as indicated in the radio resource control reconfiguration message.

Another example embodiment may be directed to an apparatus which may include at least one processor and at least one memory including computer program code. The at least one memory and the computer program code may be configured to, with the at least one processor, cause the apparatus at least to receive from a network node, a radio resource control reconfiguration message. The apparatus may also be caused to send a radio resource control reconfiguration complete message in response to the radio resource control reconfiguration message. The apparatus may further be caused to perform radio resource management measurements according to information contained in the radio resource control reconfiguration message. The apparatus may also be caused to prepare a measurement report based on the radio resource management measurements. In addition, the apparatus may be caused to send the measurement report to the network node. Further, the apparatus may be caused to maintain a spatial relation with a cell or a carrier that is identified in the measurement report, as indicated in the radio resource control reconfiguration message.

In accordance with some example embodiments, a non-transitory computer readable medium can be encoded with instructions that may, when executed in hardware, perform a method. The method may include receiving from a network node, a radio resource control reconfiguration message. The method may also include sending a radio resource control reconfiguration complete message in response to the radio resource control reconfiguration message. The method may further include performing radio resource management measurements according to information contained in the radio resource control reconfiguration message. The method may also include preparing a measurement report based on the radio resource management measurements. In addition, the method may include sending the measurement report to the network node. Further, the method may include maintaining a spatial relation with a cell or a carrier that is identified in the measurement report, as indicated in the radio resource control reconfiguration message.

In accordance with some example embodiments, a computer program product may perform a method. The method may include receiving from a network node, a radio resource control reconfiguration message. The method may also include sending a radio resource control reconfiguration complete message in response to the radio resource control reconfiguration message. The method may further include performing radio resource management measurements according to information contained in the radio resource control reconfiguration message. The method may also include preparing a measurement report based on the radio resource management measurements. In addition, the method may include sending the measurement report to the network node. Further, the method may include maintaining a spatial relation with a cell or a carrier that is identified in the measurement report, as indicated in the radio resource control reconfiguration message.

In accordance with some example embodiments, an apparatus may include circuitry configured to receive from a network node, a radio resource control reconfiguration message. The apparatus may also include circuitry configured to send a radio resource control reconfiguration complete message in response to the radio resource control reconfiguration message. The apparatus may further include circuitry configured to perform radio resource management measurements according to information contained in the radio resource control reconfiguration message. The apparatus may also include circuitry configured to prepare a measurement report based on the radio resource management measurements. In addition, the apparatus may include circuitry configured to send the measurement report to the network node. Further, the apparatus may include circuitry configured to maintain a spatial relation with a cell or a carrier that is identified in the measurement report, as indicated in the radio resource control reconfiguration message.

In accordance with some example embodiments, a method may include sending to a user equipment, a radio resource control reconfiguration message. The method may also include receiving a radio resource control reconfiguration complete message in response to the radio resource control reconfiguration message. The method may further include configuring the user equipment to perform radio resource management measurements. In addition, the method may include receiving a measurement report based on the radio resource management measurements obtained by the user equipment. Further, the method may include determining based on the measurement report, whether to configure carrier aggregation or dual connectivity for a cell or a carrier.

In accordance with some example embodiments, an apparatus may include means for sending to a user equipment, a radio resource control reconfiguration message. The apparatus may also include means for receiving a radio resource control reconfiguration complete message in response to the radio resource control reconfiguration message. The apparatus may further include means for configuring the user equipment to perform radio resource management measurements. In addition, the apparatus may include means for receiving a measurement report based on the radio resource management measurements obtained by the user equipment. Further, the apparatus may include means for determining based on the measurement report, whether to configure carrier aggregation or dual connectivity for a cell or a carrier.

In accordance with some example embodiments, an apparatus may include at least one processor and at least one memory including computer program code. The at least one memory and the computer program code may be configured to, with the at least one processor, cause the apparatus at least to send to a user equipment, a radio resource control reconfiguration message. The apparatus may also be caused to receive a radio resource control reconfiguration complete message in response to the radio resource control reconfiguration message. The apparatus may further be caused to configure the user equipment to perform radio resource management measurements. In addition, the apparatus may be caused to receive a measurement report based on the radio resource management measurements obtained by the user equipment. Further, the apparatus may be caused to determine based on the measurement report, whether to configure carrier aggregation or dual connectivity for a cell or a carrier.

In accordance with some example embodiments, a non-transitory computer readable medium can be encoded with instructions that may, when executed in hardware, perform a method. The method may include sending to a user equipment, a radio resource control reconfiguration message. The method may also include receiving a radio resource control reconfiguration complete message in response to the radio resource control reconfiguration message. The method may further include configuring the user equipment to perform radio resource management measurements. In addition, the method may include receiving a measurement report based on the radio resource management measurements obtained by the user equipment. Further, the method may include determining based on the measurement report, whether to configure carrier aggregation or dual connectivity for a cell or a carrier.

In accordance with some example embodiments, a computer program product may perform a method. The method may include sending to a user equipment, a radio resource control reconfiguration message. The method may also include receiving a radio resource control reconfiguration complete message in response to the radio resource control reconfiguration message. The method may further include configuring the user equipment to perform radio resource management measurements. In addition, the method may include receiving a measurement report based on the radio resource management measurements obtained by the user equipment. Further, the method may include determining based on the measurement report, whether to configure carrier aggregation or dual connectivity for a cell or a carrier.

In accordance with some embodiments, an apparatus may include circuitry configured to send to a user equipment, a radio resource control reconfiguration message. The apparatus may also include circuitry configured to receive a radio resource control reconfiguration complete message in response to the radio resource control reconfiguration message. The apparatus may further include circuitry configured to configure the user equipment to perform radio resource management measurements. In addition, the apparatus may include circuitry configured to receive a measurement report based on the radio resource management measurements obtained by the user equipment. Further, the apparatus may include circuitry configured to determine based on the measurement report, whether to configure carrier aggregation or dual connectivity for a cell or a carrier.

BRIEF DESCRIPTION OF THE DRAWINGS

For proper understanding of example embodiments, reference should be made to the accompanying drawings, wherein:

FIG. 1 illustrates a reference signal (RS) index configuration within ReportConfigNR in new radio (NR) radio resource control (RRC), as specified in 3GPP TS 38.331.

FIG. 2(a) illustrates an implicit configuration in MeasConfig, where Boolean variables control that any cells that report RS indexes are tracked regardless of carrier, according to an example embodiment.

FIG. 2(b) illustrates an implicit configuration in ReportConfigNR, where the Boolean variable to control the cells are reported by this event are tracked regardless of carrier, according to an example embodiment.

FIG. 2(c) illustrates an implicit configuration in MeasObjectNR, where the Boolean variable to control that the reporting configurations are linked to this frequency are tracked, according to an example embodiment.

FIG. 3(a) illustrates an explicit configuration in MeasConfig identifying which MeasObjects and ReportConfigs trigger tracking of the cells reporting indexes, according to an example embodiment.

FIG. 3(b) illustrates an explicit configuration in ReportConfigNR, where carriers and cells within each are included, according to an example embodiment.

FIG. 3(c) illustrates an implicit configuration in MeasObjectNR, where the Boolean variable control that the reporting configurations are linked to this frequency are tracked.

FIG. 7 illustrates a user equipment's response to the network configuration to perform tracking, according to an example embodiments.

DETAILED DESCRIPTION

Figure 4:
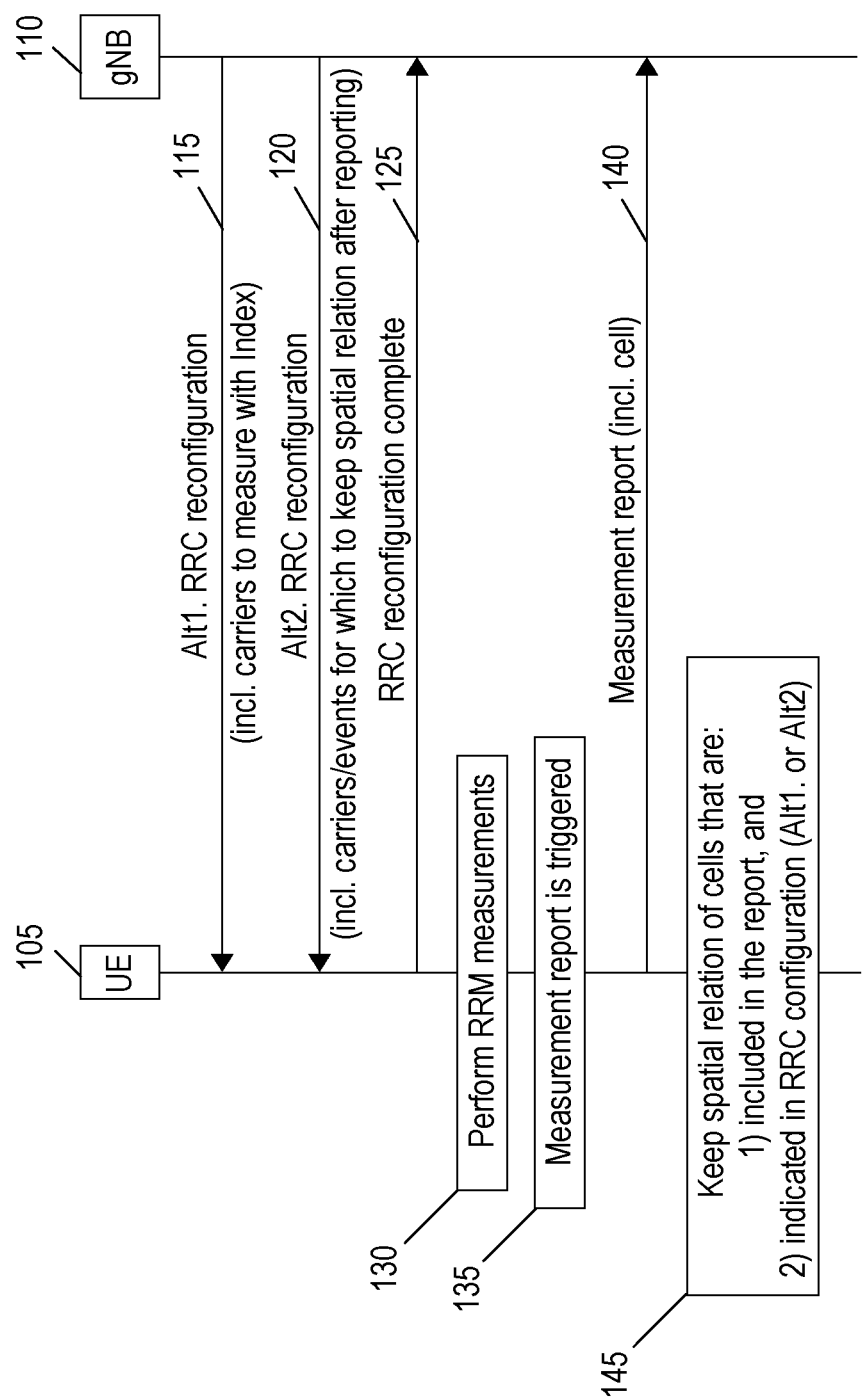
FIG. 4 illustrates a method using NR as a baseline, according to an example embodiment.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for beam tracking to reduce latency.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

The current architecture in LTE networks is fully distributed in the radio and fully centralized in the core network. The low latency applications and services in 5G require to bring the content close to the radio which leads to local breakout and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), and critical communications (autonomous vehicles, traffic safety, real-time analytics, time-critical control, healthcare applications).

New Radio (NR) has been under development in $3^{rd}$ Generation Partnership Project (3GPP). However, user equipment (UE) performance has been open for some time, and only recently closed. The performance of the first UE products have been conservative, leaving room for future improvements. For instance, such improvements may impact the 3GPP specification, while some improvements may offer solutions restricted only to the actual UE behavior without any specific need for changes to signaling or Radio Layer 1 (L1) specification. Further, such improvements may be captured solely in the UE performance specification.

One area for UE improvement may be in the expected minimum performance when the UE is operating in frequency range 2 (FR2). The challenge here, however, is that the UE and the network may need to use beam forming in order to reach a reasonable link quality, and thereby ensure a proper cell coverage and be able to service cell edge users.

Network (transmission) beam forming may represent a network that needs to transmit a synchronization signal block (SSB) in a several different directions such as, for example, in a direction of a beam coverage area. Depending on the network implementation, the network may, in one implementation, only transmit one SSB in one direction at a time. Each SSB may then be duplexed in the time domain, and all SSB's to one or more directions may be transmitted with a maximum time period of 5 ms.

UE (reception) beam forming may be similar to network beam forming. For example, in UE beam forming, the UE may receive in downlink (DL) data only on the serving DL beam. However, the UE may also be expected to continuously search and measure neighbor cells as well as perform DL beam tracking within the serving cell beams. To accomplish this, the UE may sweep its reception (Rx) beam for a time period, during which the UE would not necessarily be able to receive DL data from the serving cell/beam. This, however, may lead to certain delays in secondary cell (SCell) activation procedures and thus lead to reduction in the UE performance. For example, this may especially be the case in 3GPP Rel-15 for the initial SCell in a FR2. This may be the common case, for example, with the NR primary cell (PCell) or primary secondary cell (PSCell) in frequency range 1 (FR1), while the SCell may be in FR2. Thus, for future releases, the challenge may be more common if the UE operates with multiple Rx beams in a multiple Tx/Rx Point (TRP) environment.

Delays in SCell activation and deactivation may have certain requirements within which the UE may be able to activate a deactivated SCell and deactivate an activated SCell in Evolved Universal Mobile Telecommunications System Terrestrial Radio Access (E-UTRA) NR dual connectivity (EN-DC), in standalone NR carrier aggregation, in NR E-UTRA DC (NE-DC), or in NR-DC. In addition, the requirements may apply for EN-DC, standalone NR carrier aggregation (CA), NE-DC, and NR-DC.

For a deactivated SCell, the requirements may apply for the UE configured with one DL SCell in EN-DC, in standalone NR CA, in NE-DC, or in NR-DC, and when one SCell is being activated. The delay within which the UE shall be able to activate the deactivated SCell may depend on the specified conditions. For instance, upon receiving an SCell command in a lot n, the UE may be capable of transmitting a valid channel state index (CSI) report and apply actions related to the activation command for the SCell being activated no later than in slot $n+[T_{HARQ}+T_{activation\_time}T_{CSI\_Reporting}]$ where $T_{HARQ}$ is the timing between DL data transmission and acknowledgment.

$T_{activation\_time}$ may represent the cell activation delay. If the SCell is known and belongs to FR1, $T_{activation\_time}$ may be $[T_{SMTC\_SCell}+5$ ms$]$, if the SCell measurement cycle is equal to or smaller than [160 ms], or $[T_{SMTC\_MAX}+T_{SMTC\_SCell}+5$ ms$]$, if the SCell measurement cycle is larger than [160 ms]

If the SCell is unknown and belongs to FR1, $T_{activation\_time}$ may be $[2*T_{SMTC\_MAX}+2*T_{SMTC\_SCell}+5$ ms$]$, provided the SCell can be successfully detected on the first attempt. If the SCell being activated belongs to FR2, and if there is at least one active serving cell on that FR2 band, provided that the SSBs in the serving cell(s) and the SSBs in the SCell fulfill certain predefined conditions, $T_{activation\_time}$ may be up to $[T_{SMTC\_SCell}+5$ ms$]$.

Additionally, if the SCell being activated belongs to FR2, and there is at least one active serving cell on that FR2 band, if the UE is not provided with any SSB-based measurement timing configuration (SMTC) for the target SCell, $T_{activation\_time}$ may be 3 ms. Further, if the SCell being activated belongs to FR2, and if there is no active serving cell no that FR2 band provided that PCell or PSCell is FR1, difference scenarios may result for when the target SCell is known and when the target SCell is unknown.

In the scenario where the target SCell is known to the UE, $T_{activation\_time}$ may be up to $[T_{MAC-CE,SCell}+T_{FineTiming}+2$ ms$]$, if the UE receives the SCell activation command and transmission configuration indication (TCI) state activation command at the same time. In addition, $T_{activation\_time}$ may be $[\max\{T_{MAC-CE,SCell}, T_{uncertainty}\}+T_{MAC-CE\_TCI}+T_{FineTiming}+2$ ms$]$, if the UE receives a TCI state activation command after the SCell activation command. Further, in the scenario where the target SCell is unknown to the UE, $[T_{MAC-CE,SCell}+24*T_{SMTC\_SCell}+T_{L1-RSRP,measure}+T_{L1-RSRP,report}+T_{uncertainty}+T_{MAC-CE,TCI}+T_{FineTiming}+[T_{CSI-RS\_resource\_configuration}]+2$ ms$]$, where $T_{SMTC\_MAX}$ may be in FR1, in case of an intra-band SCell activation, the longer SMTC periodicity between active serving cells and SCell being activated. This is provided that the cell specific reference signals from the active serving cells and the SCells being activated or released are available in the same slot. In case of inter-band SCell activation, $T_{SMTC\_MAX}$ may be the SMTC periodicity of the SCell being activated.

Where $T_{SMTC\_MAX}$ may be in FR2, $T_{SMTC\_MAX}$ may be the longer SMTC periodicity between active serving cells and SCell being activated, provided that 3GPP Rel-15 supports FR2 intra-band CA. Further, $T_{SMTC\_MAX}$ may be bounded to a minimum value of 10 ms.

In $T_{SMTC\_SCell}$, SMTC periodicity of the SCell being activated and the minimum value may be 10 ms. Further, $T_{MAC-CE\_TCI}$ may be the time for TCI activation for physical downlink shared channel (PDSCH) and physical downlink control channel (PDCCH), and $T_{MAC-CE,SCell}$ may be the MAC-CE decoding time for SCell activation. In addition, $T_{FineTiming}$ may be the time period between the UE finishing decoding the last MAC CE message, and the timing of first complete available SSB corresponding to the TCI state. For unknown cases, the requirement may only be defined provided that the MAC CE for PDCCH TCI, MAC CE for PDSCH TCI and MAC CE for CSI-RS CQI reporting is after the L1-reference signal receiving power (RSRP) measurement reporting.

Additionally, $T_{uncertainty}$ may be the time period between reception of SCell activation MAC-CE and TCI activation MAC-CE for the known case. For the unknown case, uncertainty may be the time between the first L1-RSRP reporting and when UE receives TCI activation MAC-CE. Further, $T_{L1-RSRP,measure}$ may be a L1-RSRP measurement delay assuming M=1, and $T_{L1-RSRP,report}$ may be L1-RSRP reporting delay. In addition, $[T_{CSI-RS\_resource\_configuration}]$ may be the time for CSI-RS resource configuration for CQI reporting, and $T_{CSI\_reporting}$ may be the delay including uncertainty in acquiring the first available downlink CSI reference resource, UE processing time for CSI reporting and uncertainty in acquiring the first available CSI reporting resources.

SCell in FR1 is known if it has met several conditions. One condition may include a situation during the period equal to max(measCycleSCell, DRX cycles) for FR1 before the reception of the SCell activation command Specifically, during this period, the UE may have sent a valid measurement report for the SCell being activated, and the SSB measured may remain detectable according to the cell identification conditions. Further, the SSB measured during the period equal to max(measCycleSCell, DRX cycles) also remains detectable during the SCell activation delay according to the cell identification conditions. Otherwise, the SCell in FR1 is unknown.

For the first SCell activation in FR2 bands, the SCell is known if several conditions have been met. One condition may include during the period equal to [4 s] for the UE supporting power class 1 and [3 s] for the UE supporting power class 2/3/4, before the UE receives a MAC-CE command for TCI activation, the UE may have sent a valid L3-RSRP measurement report with an index, and the SCell activation command may be assumed to be received after the L3-RSRP reporting and no later than the time when the UE receives a MAC-CE command for TCI activation. Another condition may include during the period from L3-RSRP reporting to the valid CQI reporting, the reported SSBs with indexes remains detectable according to the cell identification conditions, and the TCI state may be selected based on one of the reported SSB indexes. Otherwise, the first SCell in FR2 band is unknown.

If the UE has been provided with a higher layer, signaling of smtc2 prior to the activation command, $T_{SMTC\_Scell}$ follows smtc1 or smtc2 according to the physical cell ID of the target cell being activated. In addition, $T_{SMTC\_MAX}$ may follow smtc1 or smtc2 according to the physical cell IDs of the target cells being activated and the active serving cells. In addition to CSI reporting defined above, the UE may also apply other actions related to the activation command for a SCell at the first opportunities for the corresponding actions once the SCell is activated.

The interruption on PSCell or any activated SCell in SCG for EN-DC mode may not occur before slot n+1+[$T_{HARQ}$], and may not occur after slot n+1+[$T_{HARQ}$+3 ms+ $T_{SMTC\_MAX}$+$T_{SMTC\_duration}$]. Further, the interruption on PCell or any activated SCell in a master cell group (MCG) for NR standalone mode may not occur before slot n+1+ [$T_{HARQ}$], and may not occur after slot n+1+[$T_{HARQ}$+3 ms+$T_{SMTC\_MAX}$+$T_{SMTC\_duration}$]. In addition, starting from the slot for timing for SCell activation/deactivation, and until the UE has completed the SCell activation, the UE may report out of range if the UE has available uplink resources to report CQI for the SCell.

For SCell deactivation delay requirements for an activated SCell, the requirements may apply for the UE configured with one DL SCell in EN-DC, or in standalone NR carrier aggregation, or in NE-DC, or in NR-DC. Upon receiving SCell deactivation command or upon expiry of the SCell-DeactivationTimer in slot n, the UE may accomplish the deactivation actions for the SCell being deactivated no later than in slot n+[$T_{HARQ}$+3 ms]. Further, the interruption on the PSCell or any activated SCell in Secondary Cell Group (SCG) for EN-DC mode may not occur before slot n+1+ [$T_{HARQ}$], and may not occur after slot n+1+[$T_{HARQ}$+3 ms]. In addition, interruption on the PCell or any activated SCell in MCG (Master Cell Group) for NR standalone mode may not occur before slot n+1+[$T_{HARQ}$], and may not occur after slot n+1+[$T_{HARQ}$+3 ms].

From the above, it may be seen that SCell activation delay may depend on whether the SCell is categorized as known or unknown for a first SCell in an FR2 band, but also for other SCells. In the unknown SCell case, the latency may be directly linked to the SSB periodicity. In addition, for FR2, the latency may additionally increase due to UE Rx beam forming. For example, the latency in this case may be the product of the SSB periodicity and need for UE Rx beam sweep.

In certain deployments, ensuring that the SCell is activated may be challenging. Further, the UE may receive the SCell activation command within the time constraint defined above, and it may be challenging for the network to determine when exactly an SCell is known. As such, the final activation delay and the UE movement may be unpredictable (e.g., the UE may be moving, rotating, and changing in the surrounding environment). Thus, according to certain example embodiments, it may be possible to enhance the predictability related to, for example, the SCell activation latency in the network in order to ensure a more robust and efficient CA including SCells in FR2. This may especially be important since not having a robust predictability may impact the use of deactivated SCells by keeping the SCells in an activated state, which may negatively affect the UE's power consumption.

According to certain example embodiments, the network may request SSB based measurement reporting from the UE with or without Beam(=RS) Index indication. The Index may be used by the eNB/gNB to identify which SSB has been measured and reported. As such, the Index may provide an indication of measurement results from a given DL beam. In an example embodiment, if the network has requested the UE to report SSB-based inter-frequency measurements with Beam Index, this may indicate to the UE that the reported cell may be used for CA or DC. In an example, alternatively or additionally, it may also indicate that the UE may maintain time and frequency tracking of the reported cell for a period of time after the cell has been reported (i.e., the measurement event entry condition was valid long enough to trigger a measurement report).

In another example embodiment, the network may indicate the specific (intra-frequency, inter-frequency, or inter-radio access technology (inter-RAT)) carriers on which such behavior (e.g., the UE maintaining time and frequency tracking of the reported cell for a period of time after the cell has been reported) is to be applied by the UE. For example, the UE may not be assumed to apply close cell time and frequency tracking after each measurement report with Index on every carrier. However, this may only be required on the specifically indicated carriers (to reduce UE time/frequency tracking effort, and avoid doing it on carriers where CA/DC is not possible or not desired).

According to an example embodiment, the UE reporting may also trigger a report on UE capability reductions while the tracking is ongoing. For example, the UE measurement periodicity may be affected, other baseband capabilities may be affected, or the UE may require measurement gaps to measure additional frequencies even if it indicated it did not do so earlier. According to another example embodiment, this behavior (e.g., the UE maintaining time and frequency tracking of the reported cell for a period of time after the cell has been reported) may be linked to a certain measurement event such as, for example, any A4 configuration (e.g., corresponding to when a neighbor becomes better than an absolute threshold) or measurement ID (i.e., specific A3 event on a certain carrier that may correspond to when a neighbor becomes an amount of offset better than the PCell/PSCell), or a combination of these (e.g., any A4 configuration or specific A3 event on a certain carrier). This may result in the UE being assumed to keep the UE Rx spatial relation up to date with the reported gNB Tx beam (i.e., track the reported Tx beam). This may also be realized by the UE entering a shorter DRX or measurement cycle for a period of time after reporting including Beam Index reporting. In certain example embodiments, this method is not limited to SSB-based measurements with Beam Index reporting, but may also be applied to CSI-RS based reporting.

FIG. 1 illustrates a reference signal (RS) index configuration within ReportConfigNR in NR radio resource control (RRC), as specified in TS 38.331. For example, the Report-ConfigNR may specify criteria for triggering an NR measurement reporting event. The measurement reporting event(s) may be based on cell measurement results, which may either be derived based on SS/PBCH block or CSI-RS. In addition, these events may be labelled as AN with N equal to 1, 2 and so on. As illustrated in FIG. 1, the Boolean variable may control whether the beam measurements are included. In addition, the reporting quantity indicates which reporting quantity is reported for the beam measurements, and the number of indexes indicates the maximum number of indices the UE is asked to report. However, the maximum number of indices the UE is asked to report does not suggest that the UE will always report that many indices, but rather may limit how many the UE can report.

According to certain example embodiments, there may be at least two options of indication of the UE behavior. A first option may include an implicit indication, which is where any carrier on which the UE is requested to report Index. A second option may include an explicit indication, which is where only carriers on which have been explicitly indicated to keep a spatial relation after reporting. For example, with regard to the spatial relation, the UE may keep track of the UE Rx and Tx beams in such a way these are known, and in cases where the UE moves. Here, index reporting may be independent from the new indication except that the UE may be indicated to keep the spatial relation only if the Index reporting is configured for the carrier. In certain example embodiments, these indications may also be linked for a given MeasId, MeasObject or ReportConfig. For example, an Event A4 linked to a certain carrier or linked to any carrier, or any reporting configurations linked to a certain MeasObject, or any combination of indicated MeasObjects and ReportConfigs. According to an example embodiment, the MeasId may correspond to a measurement identifier used to link reporting configuration (e.g., ReportConfigNR) and MeasObject together. Further, the IE MeasIdToAddModList may include a list of measurement identities to add or modify, with for each entry the MeasId, the associated MeasObjectId, and the associated reportConfigId. In addition, MeasObject may correspond to the configuration of a measurement object to be measured, and ReportConfigs may describe the rules when the UE shall send a measurement report to the network (the rules).

In certain example embodiments, from a configuration viewpoint, the tracking may be realized in an implicit or explicit manner. For example, the network may indicate which carriers are to be measured and tracked explicitly. Alternatively, the UE may determine carriers to be measured and tracked implicitly from other information. For example, FIG. 2(a) illustrates an implicit measurement configuration in MeasConfig, where an explicit Boolean variables (trackCellsForBeamReporting) control that any cells that report RS indexes are tracked regardless of carrier, according to an example embodiment. Further, FIG. 2(b) illustrates an implicit configuration in ReportConfigNR, where the Boolean variable to control the cells are reported by this event are tracked regardless of carrier, according to an example embodiment. In addition, FIG. 2(c) illustrates an implicit configuration in MeasObjectNR, where the Boolean variable to control that the reporting configurations are linked to this frequency are tracked, according to an example embodiment.

FIG. 3(a) illustrates an explicit configuration in MeasConfig identifying which MeasObjects and ReportConfigs trigger tracking of the cells reporting indexes, according to an example embodiment. Further, FIG. 3(b) illustrates an explicit configuration in ReportConfigNR, where carriers and cells within each are included, according to an example embodiment. In addition, FIG. 3(c) illustrates an explicit configuration in MeasObjectNR, where the Boolean variable control that the reporting configurations are linked to this frequency are tracked, according to an example embodiment.

FIG. 4 illustrates a method using NR as a baseline, according to an example embodiment. As illustrated in FIG. 4, at 115, the gNB 110 may send an RRC reconfiguration message to the UE 105. In an example embodiment, the message may include or identify carriers to measure with the Index. Alternatively, in another example embodiment, at 120, the gNB 110 may send an RRC configuration to the UE 105, where the message may include or identify carriers/events for which to keep a spatial relation after reporting. At 125, the UE 105 may send an RRC reconfiguration complete message to the gNB 110. As further, illustrated in FIG. 4, at 130, the UE 105 may perform radio resource management (RRM) measurements. Further, at 135, a measurement report may be triggered at the UE 105 for the UE 105 to generate a measurement report. At 140, the UE 105 may send the measurement report, which may include information of the cell, to the gNB 110. In addition, at 145, the UE 105 may keep a spatial relation of cells that are included in the report, and indicated in the RRC configuration (Alt. 1 or Alt. 2).

Figure 5:
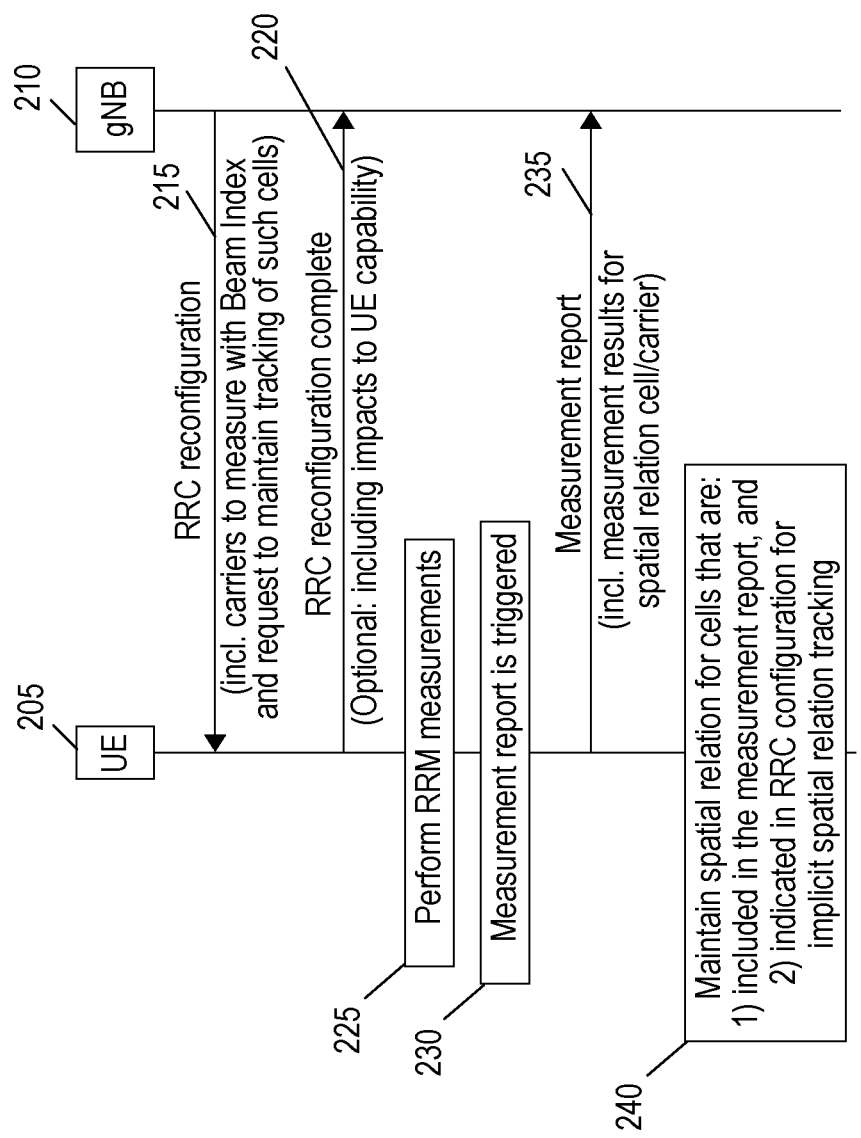
FIG. 5 illustrates Alt. 1 in FIG. 4 with implicit indication of which carriers to track, according to an example embodiment.

FIG. 5 illustrates Alt. 1 in FIG. 4 with implicit indication of which carriers to track, according to an example embodiment. As illustrated in FIG. 5, at 215, the gNB 210 may send an RRC reconfiguration message that may include or identify carriers to measure with the Beam Index, and request to maintain tracking of such cells. At 220, the UE 205 may send an RRC reconfiguration complete message, which may optionally include information on impacts to the UE capability. At 225, the UE 205 may perform RRM measurements. Further, at 230, a measurement report may be triggered at the UE 205. At 235, the UE 205 may send the measurement report to the gNB 210. In an example embodiment, the measurement report may include measurement results for spatial relation of the cell/carrier. In addition, at 240, the UE 205 may maintain a spatial relation for cells that are included in the measurement report, and cells that are indicated in the RRC configuration for implicit spatial relation tracking.

Figure 6:
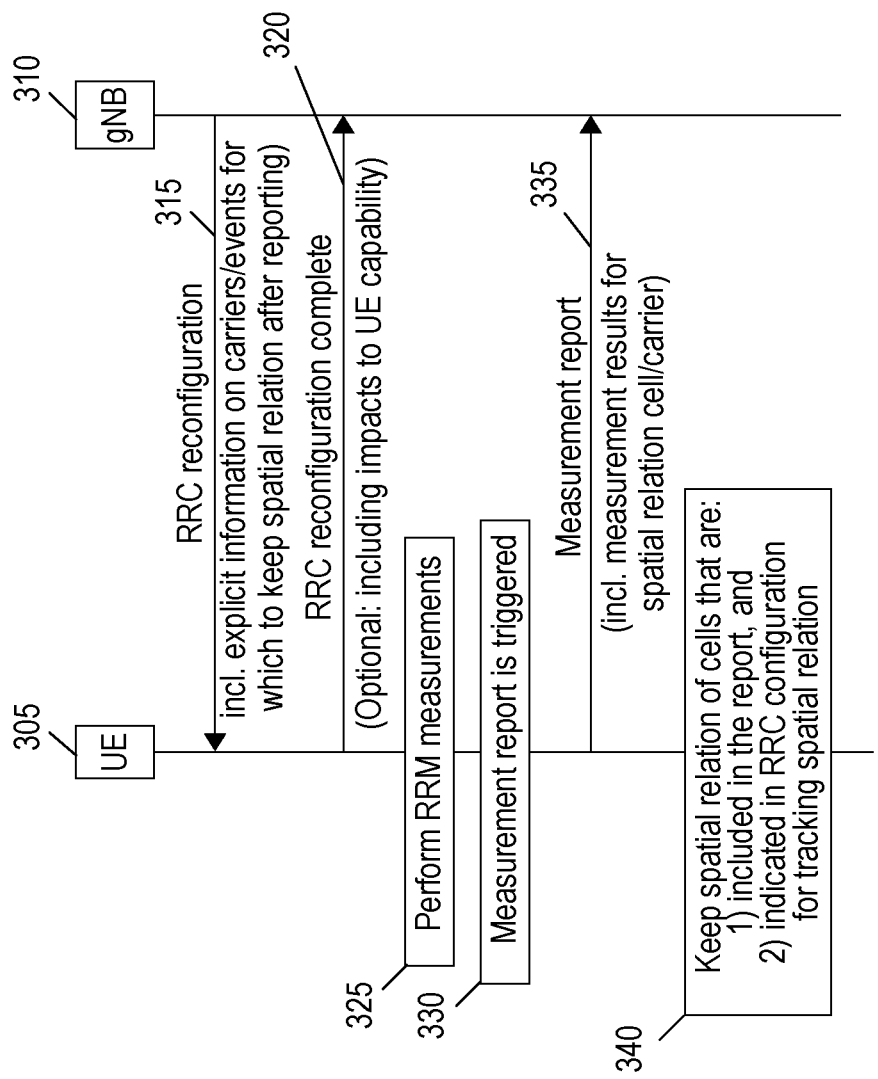
FIG. 6 illustrates Alt. 2 in FIG. 4 with an explicit indication of which carriers to track, according to an example embodiment.

FIG. 6 illustrates Alt. 2 in FIG. 4 with an explicit indication of which carriers to track, according to an example embodiment. As illustrated in FIG. 6, at 315, the gNB 310 may send an RRC reconfiguration message to the UE 305. In an example embodiment, the RRC reconfiguration message may include explicit information on carriers/events for which to keep a spatial relation after reporting. At 320, the UE 305 may send an RRC reconfiguration complete message to the gNB 310. In an example embodiment, the RRC reconfiguration complete message may optionally include information on the impacts to the UE capability. Further, at 325, the UE 305 may perform RRM measurements. In addition, at 330, a measurement report may be triggered at the UE 305. At 335, the UE 305 may send the measurement report to the gNB 310. In an example embodiment, the measurement report may include measurement results for spatial relation of the cell/carrier. Further, at 340, the UE 305 may keep a spatial relation of the one or more cells that are included in the report, and cells that are indicated in the RRC configuration for explicit spatial relation tracking.

According to certain example embodiments, for the UE in the connected mode, it may be configured by the network with carriers to measure using a dedicated configuration message. In another example embodiment, the network may indicate to the UE which of the configured carrier that are also to include the Index in the measurement report.

In an example embodiment, the UE may perform (intra-frequency/inter-frequency/inter-RAT) measurements on the configured carriers. According to example embodiments, this may be done continuously while configured by the network. If during the measurement evaluation (based on new UE measurement) an event is triggered, the UE may act according to the configuration (e.g., start TimeToTrigger (TTT) timer etc.). However, if the TTT expires and a report is sent to the network, the UE may check if the Index reporting was requested. If this is the case, the UE may continue to maintain a spatial relation with the reported Tx beam or downlink reference signal.

FIG. 7 illustrates a UE's response to the network configuration to perform tracking, according to example embodiments. For instance, in an example embodiment, the UE may track the spatial relations for a defined period of time. This time limit may in some examples be defined in the specification, it may be network controlled, it may be dependent on whether the UE is in active transmission or not, or it may be dependent on the event that was triggered. In other example embodiments, the UE may respond to the network configuration to perform the tracking by indicating some capabilities that are affected. This may be in the form of indicated capability changes such as, for example, FeatureSet changes for the current band combination, or some specific other indications including reduced data rate, reduced monitoring capability, and others.

Figure 8:
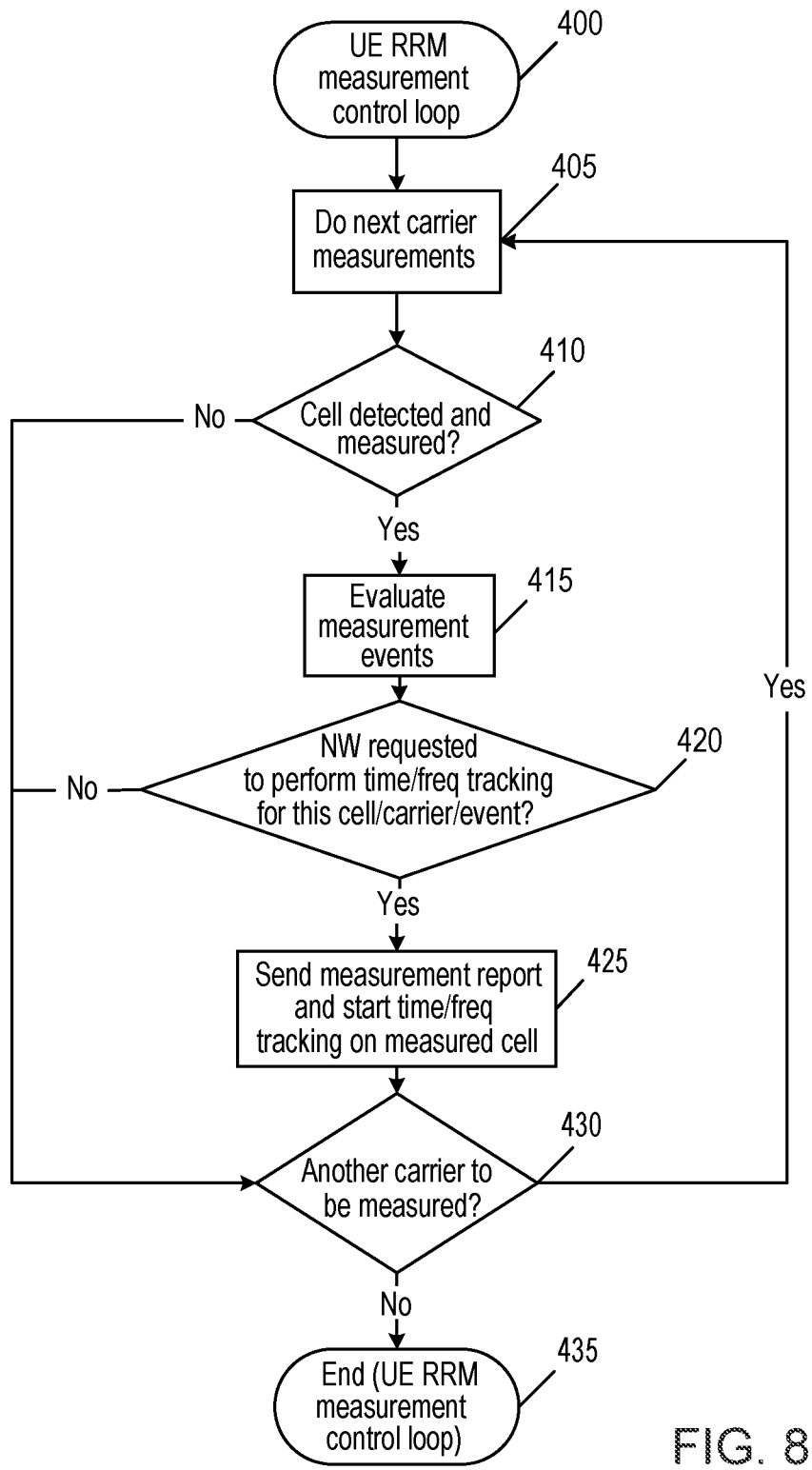
FIG. 8 illustrates a user equipment side control loop, according to an example embodiment.

FIG. 8 illustrates a UE side control loop, according to an example embodiment. As illustrated in FIG. 8, at 400, a UE RRM measurement control loop may be initiated. At 405, the UE may perform measurements for a next carrier. At 410, the UE may determine if the cell is detected and measured. If yes, then, at 415, the UE may evaluate the measurement events. At 520, the UE determines if the network has made a request to perform time/frequency tracking for this cell/carrier/event. If yes, at 425, the UE may send a measurement report (if the conditions for sending a measurement report is fulfilled), and the UE may start the time/frequency tracking on the measured cell. At 430, the UE determines if another carrier is to be measured. If no, at 435, the UE RRM measurement control loop may end.

As illustrated in FIG. 8, if at 410, it is determined that a cell is not detected and/or measured, the loop may proceed to 430, where the UE determines if another carrier is to be measured. Further, at 420, if it is determined that the network has not requested to perform a time/frequency tracking for a cell/carrier/event (e.g. UE sends measurement report but is not requested to maintain time/frequency tracking), the loop may proceed to 430, where the UE determines if another carrier is to be measured.

Figure 9:
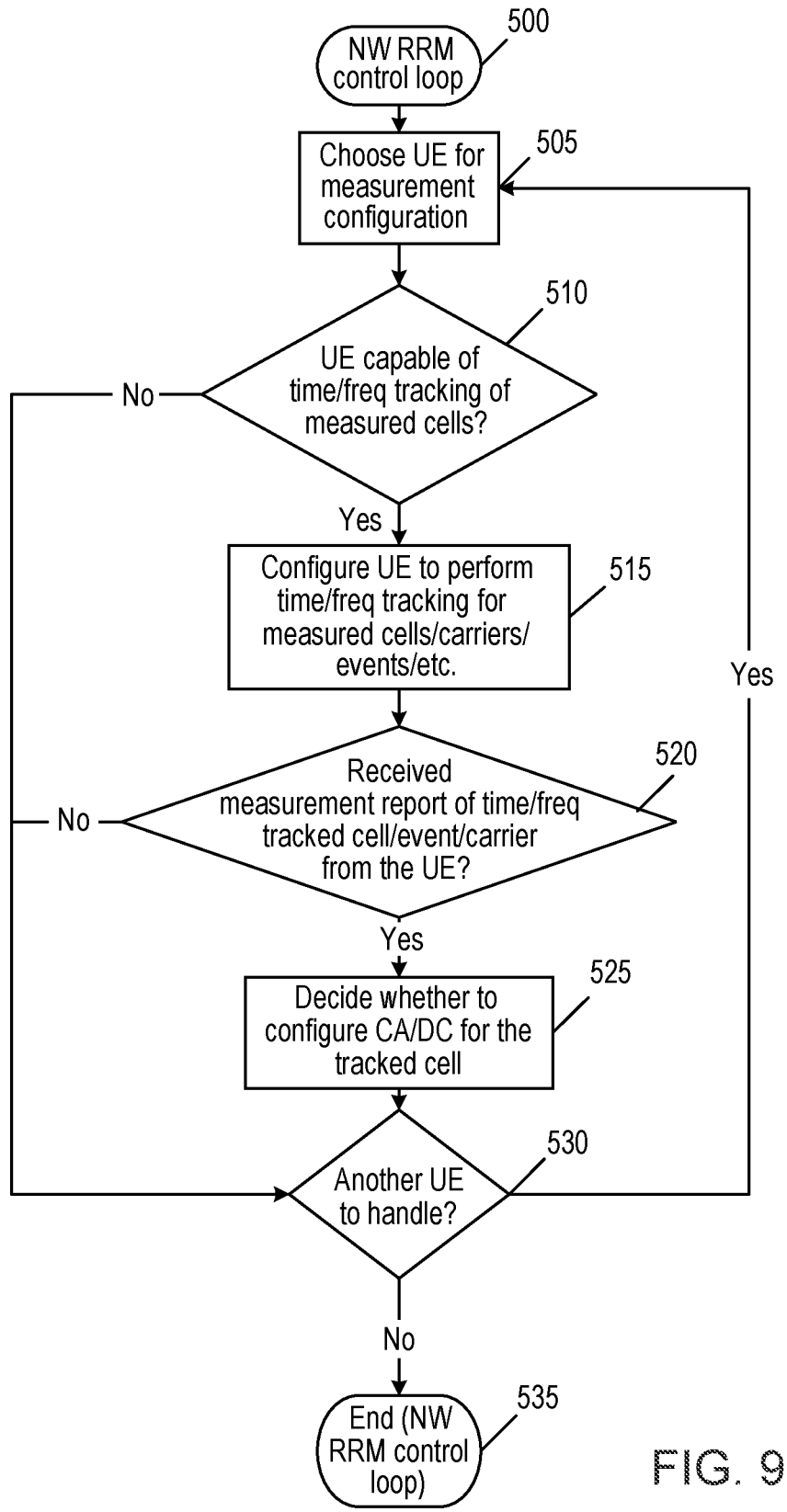
FIG. 9 illustrates a network side loop, according to an example embodiment.

FIG. 9 illustrates a network side loop, according to an example embodiment. As illustrated in FIG. 9, at 500, a network RRM control loop may be initiated. At 505, the network may select a UE to perform measurement configuration for a carrier or cell. At 510, the network may determine if the UE is capable of performing time/frequency tracing of measured cells. If yes, at 515, the network may configure the UE to perform time/frequency tracking for the measured cells/carriers/events etc. At 520, the network may determine if a measurement report of the time/frequency tracked cell/event/carrier from the UE has been received. If yes, at 525, the network may decide whether to configure the CA/DC for the tracked cell. At 530, the network may determine if another UE may be selected to handle the measurement configuration. If no, at 535, the network RRM control loop may end.

As illustrated in FIG. 9, if at 510 it is determined that the UE is not capable of time/frequency tracking of measured cells, the loop may proceed to 530, where the network determines if another UE can handle the measurement configuration. In addition, if at 520 it is determined that no measurement report has been received, the loop may proceed to 530, where the network determines if another UE can handle the measurement configuration.

Figure 10:
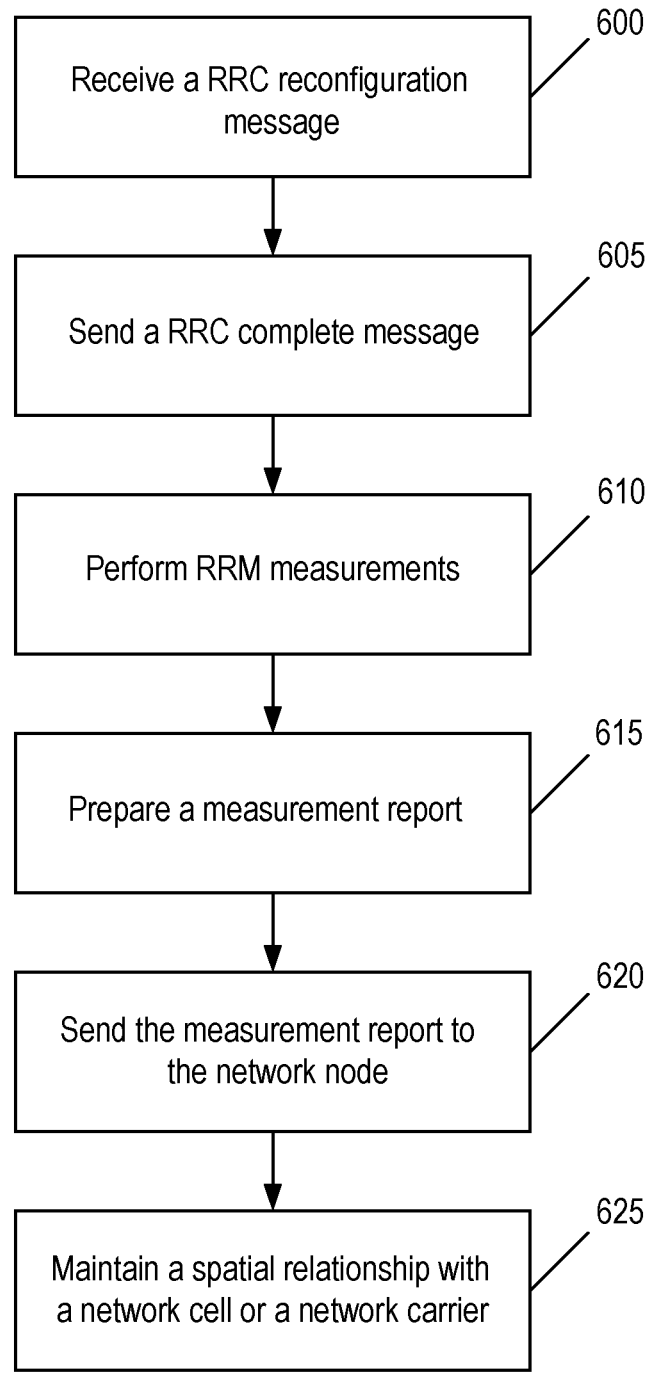
FIG. 10 illustrates a flow diagram of a method, according to an example embodiment.

FIG. 10 illustrates an example flow diagram of a method, according to an example embodiment. In certain example embodiments, the flow diagram of FIG. 10 may be performed a mobile station and/or UE, for instance similar to apparatus 10 illustrated in FIG. 12(a). According to one example embodiment, the method of FIG. 10 may include initially, at 600, receiving from a network node, a radio resource control reconfiguration message. The method may also include, at 605, sending a radio resource control reconfiguration complete message in response to the radio resource control reconfiguration message. The method may further include, at 610, performing radio resource management measurements according to information contained in the radio resource control reconfiguration message. In addition, the method may include at 615, preparing a measurement report based on the radio resource management measurements. Further, the method may include at 620, sending the measurement report to the network node. The method may also include, at 625, maintaining a spatial relation with a cell or a carrier that is identified in the measurement report, as indicated in the radio resource control reconfiguration message.

Figure 11:
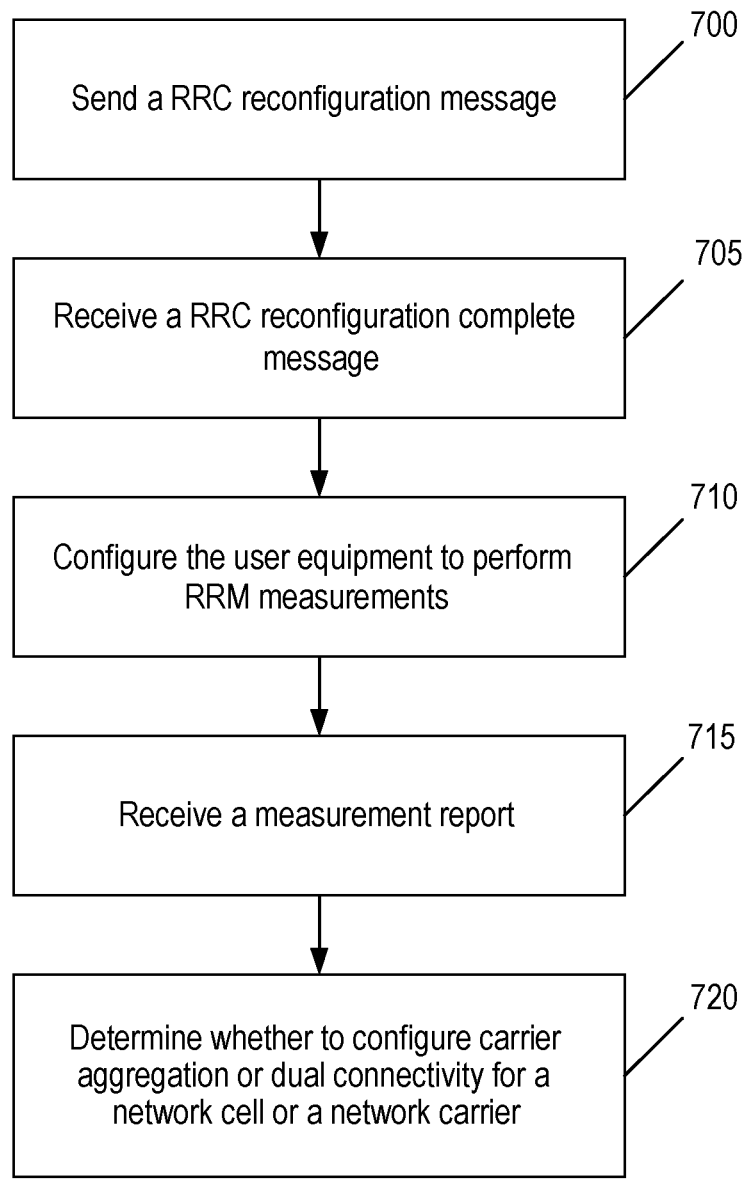
FIG. 11 illustrates a flow diagram of another method, according to an example embodiment.

FIG. 11 illustrates a flow diagram of another method, according to an example embodiment. In an example embodiment, the method of FIG. 11 may be performed by a network entity or network node in a 3GPP system, such as LTE or 5G-NR. For instance, in an example embodiment, the method of FIG. 11 may be performed by a base station, eNB, or gNB, for instance similar to apparatus 20 illustrated in FIG. 12(b).

According to an example embodiment, the method of FIG. 5 may include initially, at 700, sending to a user equipment, a radio resource control reconfiguration message. The method may also include, at 705, receiving a radio resource control reconfiguration complete message in response to the radio resource control reconfiguration message. The method may further include, at 710, configuring the user equipment to perform radio resource management measurements. In addition, the method may include, at 715, receiving a measurement report based on the radio resource management measurements obtained by the user equipment. Further, the method may include, at 720, determining based on the measurement report, whether to configure carrier aggregation or dual connectivity for a cell or a carrier.

According to an example embodiment, the information in the radio resource control reconfiguration message may identify a carrier to measure, and comprises an index that identifies which synchronization signal block that has been measured and reported, and may include a request to maintain tracking of the cell or the carrier. In another example embodiment, the information in the radio resource control reconfiguration message may include explicit information on carriers or events for which to keep spatial relations after the radio resource management measurements have been reported. According to a further example embodiment, the radio resource control reconfiguration complete message may include information identifying impacts to a user equipment's capabilities.

In another example embodiment, the measurement report may include measurement results for the spatial relations of the cell or the carrier. According to an example embodiment, the maintaining may include maintaining a spatial relation with the cell or the carrier that is indicated in the radio resource control reconfiguration message for implicit spatial relation tracking. According to a further example embodiment, the maintaining may include maintaining a spatial relation with the cell or the carrier that is indicated in the radio resource control reconfiguration message for tracking spatial relation.

Figure 12A:
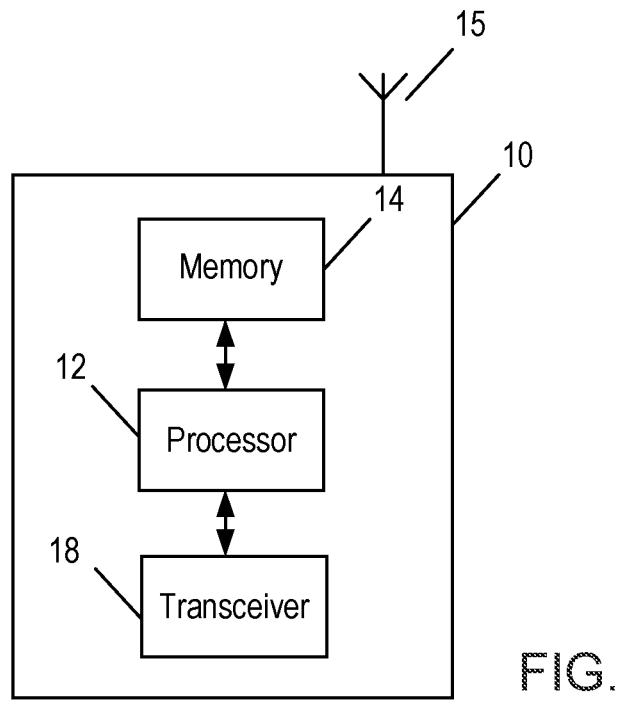
FIG. 12(a) illustrates an apparatus, according to an example embodiment.
Figure 12B:
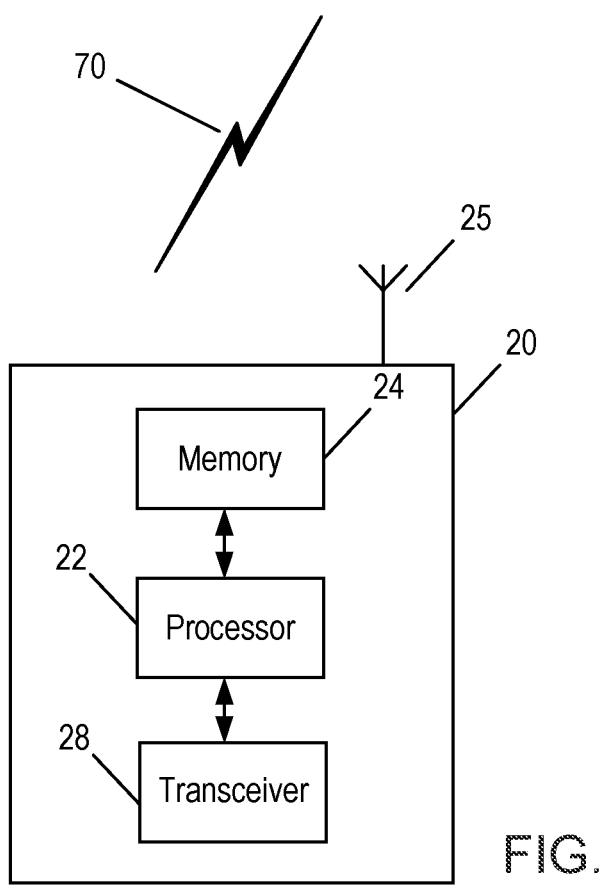
FIG. 12(b) illustrates another apparatus, according to an example embodiment.

FIG. 12(a) illustrates an apparatus 10 according to an example embodiment. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 12(a).

As illustrated in the example of FIG. 12(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 12(a), multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-8 and 10.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-8 and 10.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 10 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a UE for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to receive from a network node, a radio resource control reconfiguration message. Apparatus 10 may also be controlled by memory 14 and processor 12 to send a radio resource control reconfiguration complete message in response to the radio resource control reconfiguration message. Apparatus 10 may further be controlled by memory 14 and processor 12 to perform radio resource management measurements according to information contained in the radio resource control reconfiguration message. In addition, apparatus 10 may be controlled by memory 14 and processor 12 to prepare a measurement report based on the radio resource management measurements. Further, apparatus 10 may be controlled by memory 14 and processor 12 to send the measurement report to the network node. Apparatus 10 may also be controlled by memory 14 and processor 12 to maintain a spatial relation with a cell or a carrier that is identified in the measurement report, as indicated in the radio resource control reconfiguration message.

FIG. 12(*b*) illustrates an apparatus 20 according to an example embodiment. In an example embodiment, the apparatus 20 may be a RAT, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 12(*b*).

As illustrated in the example of FIG. 12(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 12(*b*), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-7, 9, and 11.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-7, 9, and 11.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a radio resource manager, RAT, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

For instance, in one embodiment, apparatus 20 may be controlled by memory 24 and processor 22 to send to a user equipment, a radio resource control reconfiguration message. Apparatus 20 may also be controlled by memory 24 and processor 22 to receive a radio resource control reconfiguration complete message in response to the radio resource control reconfiguration message. Apparatus 20 may further be controlled by memory 24 and processor 22 to configure the user equipment to perform radio resource management measurements. In addition, apparatus 20 may be controlled by memory 24 and processor 22 to receive a measurement report based on the radio resource management measurements obtained by the user equipment. Further, apparatus 20 may be controlled by memory 24 and processor 22 to determine based on the measurement report, whether to configure carrier aggregation or dual connectivity for a cell or a carrier.

Certain example embodiments described herein provide several technical improvements, enhancements, and/or advantages. In some example embodiments, it may be possible to achieve low latency of SCell setup in NR since the UE may track the cells it measures, and it may activate them faster. In other example embodiments, it may be possible achieve a robust and efficient CA, including SCells in FR2. Additionally, in certain example embodiments, it may be possible for the network to more easily configure CA. This is not limited only to CA, but could be similarly applied to dual or multi-connectivity forms (for example, EN-DC, NE-DC and alike). According to other example embodiments, it may be possible to lower latency and improve UE power consumption (reduction). It may also be possible to achieve a robust and efficient DC, including PSCells in FR2.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

DL Downlink
DRX Discontinuous Reception
eNB Enhanced Node B
FR1 Frequency Range 1
FR2 Frequency Range 2
gNB 5G or NR Base Station
LTE Long Term Evolution
NR New Radio
PCell Primary Cell
PSCell Primary Secondary Cell
SCell Secondary Cell
RX Reception
SSB Synchronization Signal Block
TTT Time to Trigger
TX Transmission
UE User Equipment

We claim:

1. An apparatus, comprising:
at least one processor; and
at least one memory comprising computer program code,
the at least one memory and the computer program code are configured, with the at least one processor to cause the apparatus at least to
receive from a network node (110), a radio resource control reconfiguration message (115*a*);
send a radio resource control (RRC) reconfiguration complete message (125*a*) in response to the RRC reconfiguration message, wherein the RRC reconfiguration complete message includes information on impacts to a user equipment's capabilities including FeatureSet changes for a current band combination and specific indications including reduced data rate and reduced monitoring capability for the user equipment;

perform radio resource management measurements (130) according to information contained in the radio resource control reconfiguration message (115a), wherein the information in the RRC reconfiguration message identifies a carrier to measure, and comprises: an index that identifies which synchronization signal block that has been measured and reported, and a request to maintain tracking of a cell or a carrier;

maintain, based on the request, time and frequency tracking of the cell or carrier for a period of time after the cell or carrier has been reported;

prepare a measurement report (135) based on the radio resource management measurements (130);

send (140) the measurement report (135) to the network node (110); and maintain a spatial relation (145) with a reported cell (145a) or a carrier (145b) that is identified in the measurement report (135), as indicated in the radio resource control reconfiguration message (115a).

2. The apparatus according to claim 1, wherein the information in the radio resource control reconfiguration message comprises explicit information on carriers or events for which to keep spatial relations after the radio resource management measurements have been reported.

3. The apparatus according to claim 1, wherein the measurement report comprises measurement results for the spatial relations of the cell or the carrier.

4. The apparatus according to claim 1, wherein the maintaining comprises maintaining a spatial relation with the cell or the carrier that is indicated in the radio resource control reconfiguration message for implicit spatial relation tracking.

5. The apparatus according to claim 1, wherein the maintaining comprises maintaining a spatial relation with the cell or the carrier that is indicated in the radio resource control reconfiguration message for tracking spatial relation.

6. An apparatus, comprising:
at least one processor; and
at least one memory comprising computer program code, the at least one memory and the computer program code are configured, with the at least one processor to cause the apparatus at least to
send to a user equipment, a radio resource control (RRC) reconfiguration message;
receive a RRC reconfiguration complete message in response to the radio resource control reconfiguration message, wherein the RRC reconfiguration complete message includes information on impacts to a user equipment's capabilities including FeatureSet changes for a current band combination and specific indications including reduced data rate and reduced monitoring capability for the user equipment;
configure the user equipment to perform radio resource management measurements according to information contained in the radio resource control reconfiguration message (115a), wherein the information in the RRC reconfiguration message identifies a carrier to measure, and comprises an index that identifies which synchronization signal block that has been measured and reported, and comprises a request to maintain tracking of a cell or a carrier;
receive a measurement report based on the radio resource management measurements obtained by the user equipment which includes time and frequency tracking of the cell or carrier which were maintained for a period of time after the cell or carrier has been reported; and
determine based on the measurement report, whether to configure carrier aggregation or dual connectivity for a cell or a carrier.

7. The apparatus according to claim 6, wherein the information in the radio resource control reconfiguration message identifies a carrier to measure, and comprises an index that identifies which synchronization signal block that has been measured and reported, and comprises a request to maintain tracking of the cell or the carrier.

8. The apparatus according to claim 6, wherein the information in the radio resource control reconfiguration message comprises explicit information on carriers or events for which the user equipment is to keep spatial relations after the radio resource management measurements have been reported.

9. The apparatus according to claim 6, wherein the radio resource control reconfiguration complete message comprises information identifying impacts to a user equipment's capabilities.

10. The apparatus according to claim 6, wherein the measurement report comprises measurement results for spatial relations of the cell or the carrier.

* * * * *